Feb. 11, 1964  M. SILBER  3,120,708
TEACHING MACHINE
Filed July 16, 1962  3 Sheets-Sheet 1
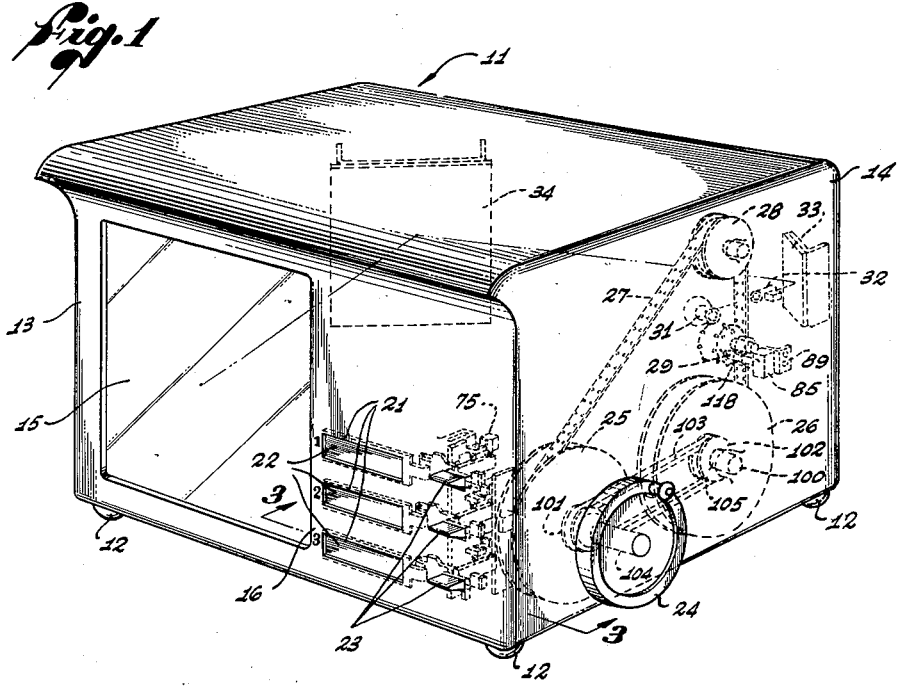
INVENTOR.
MAURICE SILBER
BY Fulwider Mattingly & Huntley
ATTORNEYS

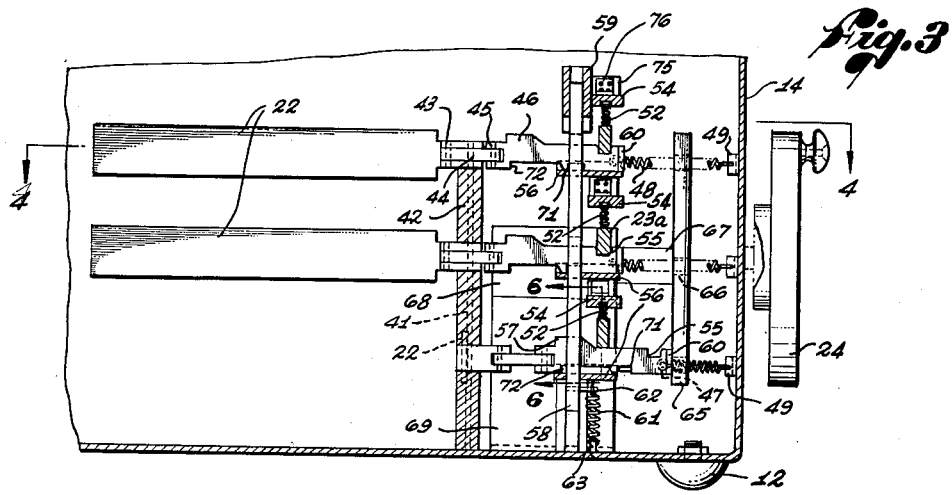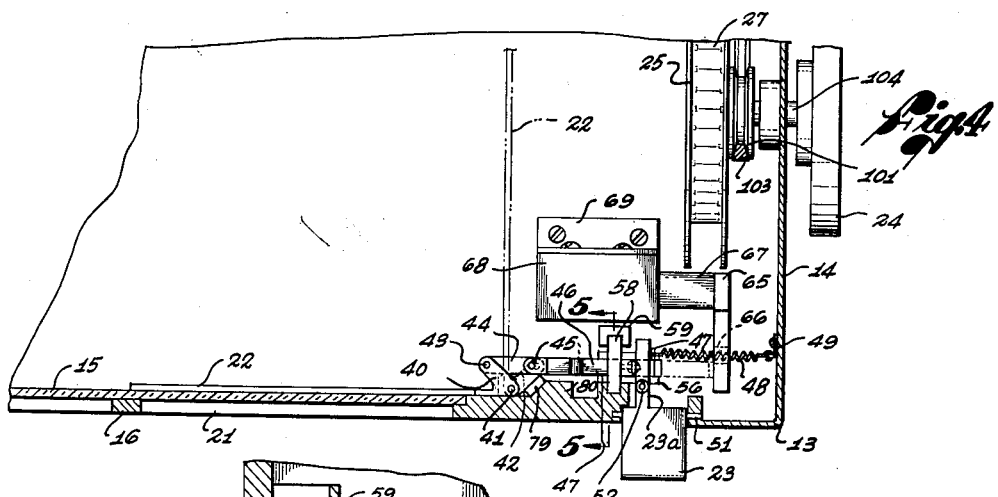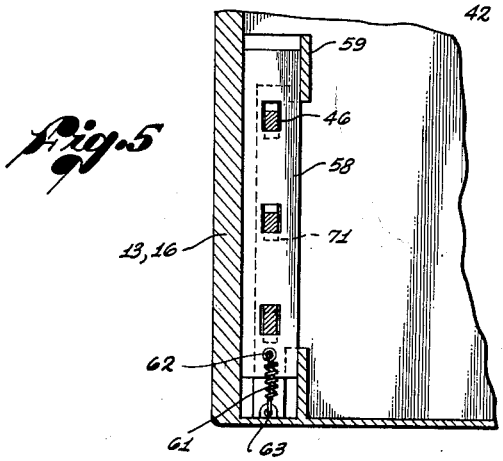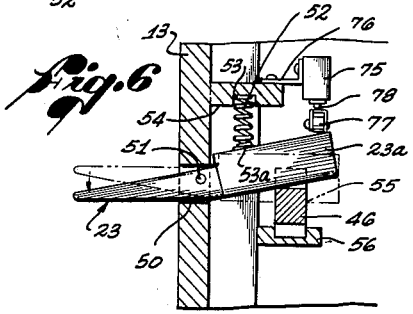

Feb. 11, 1964 M. SILBER 3,120,708
TEACHING MACHINE
Filed July 16, 1962 3 Sheets-Sheet 3
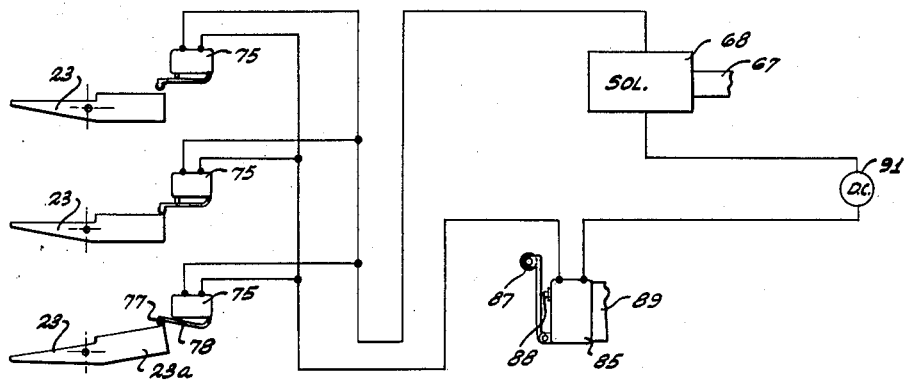
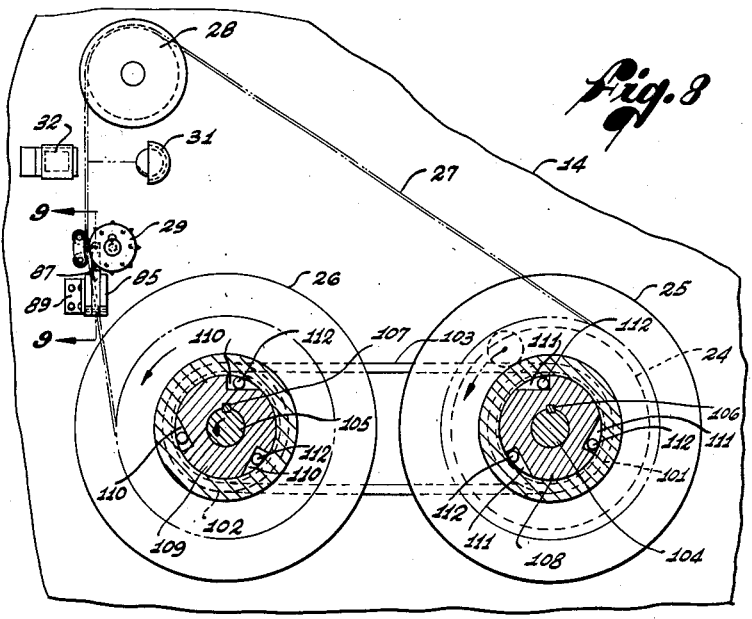
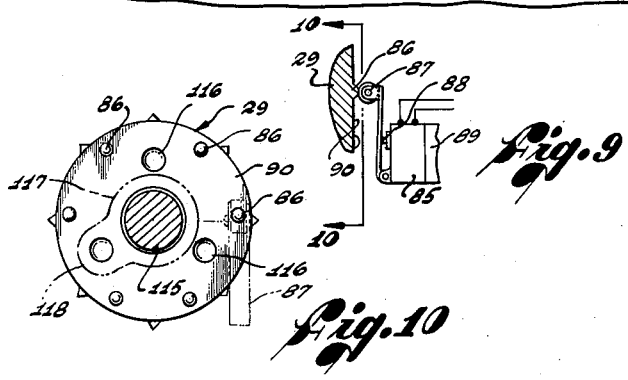
INVENTOR.
MAURICE SILBER United States Patent Office 3,120,708
Patented Feb. 11, 1964

3,120,708
TEACHING MACHINE
Maurice Silber, Sepulveda, Calif., assignor to System Development Corporation, Santa Monica, Calif., a corporation of California
Filed July 16, 1962, Ser. No. 209,862
15 Claims. (Cl. 35—9)

This invention relates generally to teaching machines, and more particularly to a new and improved self-tutoring device which greatly facilitates the instruction of individual students while minimizing the time and effort required of the instructor for each student.

It is generally well known in the educational field that individual instruction of students is far superior to group instruction, because the course of study can be tailored so that information is presented at a pace and in a manner commensurate with the needs and capabilities of any given student. Unfortunately, such individual instruction requires a great deal of time and effort upon the part of the instructor and, hence, reduces the number of students which can be taught by a single instructor. As a practical matter, therefore, individualized instruction of students must be sacrificed in the interest of enabling the instructor to teach larger groups of students.

Teaching aids of various types have been used in an effort to enable students to learn at their own paces. In recent years, considerable time, effort and expense have been devoted to the development of self-tutoring devices which closely approximate the more desirable individualized instruction situation. For the desired purposes, an effective self-tutoring device must be capable of presenting a series of information displays in a logical sequence. This sequence of information displays should be variable in accordance with the student's demonstrated reaction to each individual information display.

The self-tutoring devices of the prior art leave much to be desired. In many such devices, the student is kept in the dark as to his progress, with regard to any given information display, until he is actually confronted with subsequent displays. Hence, the student may be required to answer a question regarding the text in an information display, and be directed to a subsequent display in accordance with his selected answer, without actually knowing whether his answer was right or wrong. Moreover, such devices frequently enable the student to select and view the directives for more than one answer. The latter arrangement enables the student to upset the tailoring process, since he is able to choose his own sequence of text presentation which may or may not be in accordance with his capacity to assimilate the preceding text material.

A number of self-tutoring devices which do immediately advise a student of results suffer from the disadvantage that the student who selects a wrong answer is not prevented by the mechanism from trying other answers until he finds the correct one. In such devices, a student is not forced to experience the necessary review process dictated by his lack of assimilation. Instead, the student is able to pursue a study sequence in accordance wtih the correct answers, regardless of his ability or lack of ability to select these correct answers on the basis of information previously presented to him. Obviously, if it permits such "cheating" by a student, the device is not capable of simulating the desired teacher-individual student learning situation.

Some self-tutoring machines that meet some of these problems are extremely complex mechanism, and are very expensive. Their very complexity creates technical problems, and requires frequent attention to maintain them in proper operating condition. They are also unduly large and heavy.

Accordingly, it is an object of the present invention to provide a new and improved self-tutoring teaching machine which overcomes the above and other disadvantages of the prior art.

Another object is to provide an improved self-tutoring machine which is simple in structural arrangement, which is small and light, relatively inexpensive to fabricate, and which is easily adaptable to a wide range of different courses of study.

A further object of the invention is the provision of a new and improved self-tutoring device embodying a mechanism for varying the sequence of information displays to the student pursuant to the student's grasp of what has gone before.

Still another object is to provide a teaching machine adapted for self-tutoring wherein each information display provides text, an appropriate question, a plurality of answers, immediate knowledge of results and directions to subsequent information displays, and wherein the student is prevented by the machine from receiving knowledge of results and directions for more than a single answer.

Yet another object of the present invention is the provision of a simplified self-tutoring device in which the student is given an immediate indication of the correctness or incorrectness of an answer to a question pertaining to presently displayed information, as well as directions to proceed to other information displays, and wherein selection by the student of one answer prevents selection of any other until the student has complied with the directions of the first answer.

A still further object is to provide a self-tutoring teaching machine which automatically tailors the presentation of the subject matter to the student in a manner which constantly keeps him apprised of his immediate state of progress, while simultaneously inhibits the student from pursuing a sequence of study which is incompatible with his demonstrated capabilities.

Another object of the invention is the provision of a simple mechanical arrangement for enabling a student to manually change from one information display to another, and which cooperates with a novel answer selecting and locking system to reset the latter system for subsequent information displays once it has become locked with respect to the answers for a previous information display.

The above and other objects and advantages of this invention will be better understood by reference to the following detailed description when considered in connection with the accompanying drawings of an illustrative embodiment thereof, wherein:

FIGURE 1 is a perspective view of a teaching machine in accordance with the present invention, internal portions being shown in phantom to illustrate the cooperation with external mechanisms operated by a student;

FIGURE 2 is a front elevational view of the display screen upon which a typical film frame has been projected, and shows the novel arrangement of text material, question, answers, and indication of results together with appropriate directions for each answer;

FIGURE 3 is a fragmentary sectional view, taken along the line 3—3 of FIGURE 1, and illustrates the structural arrangement of the answer selection and locking system;

FIGURE 4 is a fragmentary sectional view, taken along the line 4—4 of FIGURE 3, and shows how each answer bar may be actuated by an answer selection tab;

FIGURE 5 is a fragmentary sectional view, taken along the line 5—5 of FIGURE 4, and further illustrates the structure and operation of the locking bar;

FIGURE 6 is an enlarged fragmentary sectional view, taken along the line 6—6 of FIGURE 3, and shows how the answer selection tab functions to release an answer bar and simultaneously condition the resetting system;

FIGURE 7 is a circuit diagram illustrating the electrical system for activating an answer bar and resetting solenoid;

FIGURE 8 is a partial elevational view as seen from the inside of the teaching machine housing, portions of the reeling mechanism being shown in section to show internal structure;

FIGURE 9 is an enlarged fragmentary sectional view, taken along the line 9—9 of FIGURE 8, and shows how the film sprocket structure activates a switch in the electrical circuit of FIGURE 7; and FIGURE 10 is a fragmentary sectional view, taken along the line 10—10 of FIGURE 9, to illustrate the structural details of the film sprocket which cooperate with the electrical circuit of the answer bar resetting system and also permit more accurate registration of projected film frames.

Referring now to the drawings, and particularly to FIGURE 1 thereof, there is shown a teaching machine 11 which comprises a housing having a display panel 13, and which has corner rests 12 of resilient, non-skid material to safeguard a surface on which the device is placed. The front panel 13 has an opening in which is positioned a display screen 15, of opal or ground glass or the like, and upon which the image of any film frame from a film 27 may be projected.

Although the information display for each film frame is different, the physical arrangement of the information presented by each film frame is consistent from one frame to another. In this regard, the arrangement of indicia for a typical film frame is shown in FIGURE 2. Each of the film frames projected upon the screen 15 contains a text material section 17 followed by a question section 18. Immediately below and to the left of the question 18 are a plurality of answer choices 19 which are arranged one below the other. To the right, and in general horizontal alignment with each answer 19, is an information line 20 which advises the student as to the correctness or incorrectness of the answer on that line, and also provides directions to the student regarding the number of the next film frame which he is to display and read.

As shown in FIGURE 1, the front panel 13 is provided with a shielding baffle 16 which overlays that portion of the display screen 15 upon which the knowledge of results and directive portions 20 of the film frame are projected. The shielding baffle 16 is, in turn, provided with a plurality of slots 21, each slot being in alignment with and framing a knowledge of results and directive line 20 projected upon the display screen 15. In this regard, answer bars 22 are provided, one behind and blocking each of the slots 21, and which may be selectively moved away from the slots by depressing an appropriate answer selecting tab 23. With this structural arrangement in mind, the manner of operation of the teaching machine 11 for self-tutoring purposes will become apparent from the following discussion.

The information presented upon the display screen 15 is under the control of the student. This is done by simply rotating a hand crank 24, in either direction, to move the film 27 to any desired film frame position. In this connection, the film 27 is carried by a pair of take-up and supply reels 25, 26 and is threaded around an idler pulley 28 to be engaged by a film sprocket 29.

A suitable projection system, comprising a source of illumination 31, a lens 32, and a pair of mirrors 33, 34 is utilized to project the image of the film 27 upon the display screen 15. The optical arrangement shown is designed to provide a projected image of sufficient size upon the display screen 15 within a small housing. However, with lenses 32 of sufficiently short focal length, the mirrors 33, 34 may be omitted, and the image may be projected directly upon the screen 15 from the lens 32.

In actual operation, the frames of the film 27 are consecutively numbered, but the text material on consecutive frames of the film are not in logical sequence. Thus, the student cannot go through a course by merely cranking ahead one frame at a time. A logical sequence in the order of film frames displayed upon the screen 15 for viewing by the student can be obtained only by following the directive 20 corresponding to an answer selected by the student.

When the student has completed his study of the text material 17 of a film frame projected upon the screen 15, he must select one of the answers 19 in response to the question 18 which is designed to ascertain the extent to which the student has assimilated the information set forth in the text material section. Hence, only by choosing one of the answers 19 can the student gain access to a directive 20 which will enable him to proceed to another film frame bearing a logical relationship to the material already viewed.

When the student has made his decision as to the proper answer 19 to the question 18, he depresses the answer selecting tab 23 corresponding to his selected answer. Depression of the tab 23 causes the associated answer bar 22 to move and unmask the information line 20 appearing within the slot 21. The information line 20 gives the student immediate knowledge of the correctness or incorrectness of his answer, and also advises him of the number of the next film frame which he is to view by turning the hand crank 24.

Where the student has selected a correct answer, he is directed to a film frame which will expand upon the fund of knowledge already displayed. On the other hand, where the student's answer is wrong, he will be directed, in accordance with the nature of his error, to a film frame bearing review material designed to clarify the student's apparent misunderstanding of the previously displayed text material.

It is well known that many students have a tendency to avoid the review process, whenever possible, and forge ahead in the course of study though they may be unable to properly assimilate what they are reading. Hence, upon receipt of knowledge of an erroneous answer, the student may be tempted to select other answers 19 to ascertain the film frame directive for the correct answer. To allow the student to proceed in such a manner would greatly diminish the efficiency of the learning process and frustrate the objectives of the self-tutoring aid.

In the teaching machine 11 of the present invention, the selection of a single answer 19 by pressing the appropriate answer selecting tab 23 automatically precludes the student from access to any of the information lines 20 for any answer other than the answer selected. The latter is accomplished by a locking arrangement which is actuated by depression of any one of the tabs 23, and therby prevents depression of any of the remaining tabs from removing additional answer bars 22. In this manner, the only way the student can logically proceed in the course of study is to follow the directive for his selected answer, regardless of the correctness or incorrectness of his selected answer. Hence, the student is forced to experience a review process whenever his selected answer indicates such review is necessary.

In the foregoing manner, the sequence of study from one frame to another is tailored to meet the needs and capabilities of the individual student, in accordance with the degree of information assimilation demonstrated by the student's selected answers. Hence, the teaching machine 11 of the present invention involves a unique cooperation between the information upon the film 27 and the mechanism for presenting it pursuant to the student's grasp of what has gone before.

The simplicity of the arrangement shown in FIGURES 1 and 2 enables the teaching machine 11 to be adapted from one course of study to another and different course of study merely by changing the film 27 within the machine. No modifications of the machine mechanisms are required.

The nature of the mechanisms within the teaching machine 11 for accomplishing the aforedescribed objectives and operational requirements are shown in detail in FIGURES 3 through 10 of the drawings.

Each of the answer bars 22 consists of a long flat masking plate terminating in a bell crank portion 40 (see FIGURE 4). The end of each bell crank portion 40 nearest the answer bar 22 is pivotally connected by a pin 41 to a boss 42 extending from the inner wall surface of the front panel 13. The other end of each well crank is pivotally connected by a pin 43 to a link strap 44, the opposite end of the link strap being pivotally connected by the pin 45 to a slide bar 46 supported for sliding engagement along a horizontal flange 56.

Each slide bar 46 is biased toward the side wall 14 of the housing 12 nearest the crank 24, as by a spring 48 secured at one end to the slide bar at 47, and secured at the other end to the side wall at 49. In this regard, a slide bar limiting and reset block 65, solenoid-controlled, is provided with openings 66 through which the springs 48 extend.

Each of the answer selecting tabs 23 extends through an opening 50 in the front panel 13 (see FIGURE 6) and is pivotally mounted therein by a pin 51. The rear portion of each answer tab 23 consists of a locking shoulder 23a, the lower portion of which normally engages a slot 55 in the answer bar 46 (see FIGURE 3). Each tab 23 is biased to the undepressed position (shown in phantom in FIGURE 6) by a spring 52. The upper end of the spring 52 engages a seat 53 in a flange 54 extending inwardly of the housing from the front panel 13. The lower end of the spring 52 abuts the upper portion of the locking shoulder 23a, and is held in place by a projection 53a, to produce a clockwise moment about the pin 51 and bias the locking shoulder into the slot 55 of the slide bar 46.

Depression of the answer selecting tab 23, as shown in FIGURE 6, causes the locking shoulder 23a to rise and become disengaged from the slot 55. The slide bar 46 is then free to move towards the side wall 14, under the influence of the spring 48, until it is stopped by the reset block 65. This is the position shown for the bottom slide bar 46 in FIGURE 3.

When the slide bar 46 and link strap 44 move to the right, the answer bar 22 rotates about the pin 41 and assumes the position shown in phantom in FIGURE 4. When so actuated, the bell crank 40 of the answer bar 22 comes to rest against a flexible pad 42 abutting a shoulder 80 extending inwardly from the front panel 13. The use of a flexible pad 42 for each of the answer bars 22 minimizes the noise level of the machine when an answer is selected and the appropriate answer bar is retracted. Similar flexible pads 60 are mounted upon the ends of the bars 46 nearest the side wall 14 to reduce noise when these bars strike the reset block 65.

Movement of any slide bar 46 to the right by one of the springs 48 not only causes rotation of the answer bar 22, as shown in FIGURE 4, but also activates a locking arrangement for preventing movement to the right of any other slide bar, even when its respective answer tab 23 is depressed. In this regard, each slide bar 46 carries an upstanding shoulder 57 which raises a locking bar 58 when any slide bar moves towards the side wall 14.

The locking bar 58 (see FIGURES 3–5) moves within a guiding sleeve 59, and is biased in the downward direction by a spring 61 secured at one end to a locking bar pin 62, the other end of the spring being secured at 63 to the bottom wall of the machine housing.

When the locking bar 58 rises, by virtue of the lifting action of the shoulder 57, the locking bar engages slots 71 provided in the lower surface of each of the nonactuated slide bars 46. Hence, each of the slide bars 46, engaged by the locking bar 58 in the slots 71, is restrained against lateral movement towards the side wall 14. Each of the slide bars 46 is also provided with a lower clearance slot 72 so that an actuated slide bar will not interfere with the upward travel of the locking bar 58 even though the slot 71 of the actuated slide bar is not in alignment with the locking bar.

Resetting of the actuated slide bar 46 and unlocking of the remaining slide bars is accomplished by moving the reset block 65 to the left, away from the side wall 14. In this manner, the upstanding shoulder 57 of the actuated slide bar is disengaged from the locking bar 58. The locking bar 58 then slides downward in the sleeve 59 and thereby becomes disengaged from the slots 71 to release all the slide bars 46.

The reset block 65 is under the control of a solenoid 68, the plunger 67 of which is secured to one side of the reset block. The solenoid 68 is mounted upon a bracket 69 which is, in turn, secured to the bottom wall of the machine housing.

When the solenoid 68 is energized, in a manner to be subsequently described, the plunger 67 is retracted, and thereby causes the reset block 65 to move to the left. Referring now particularly to FIGURES 6, 7, 9, and 10, the electromechanical system for causing the solenoid 68 to be energized will become apparent.

Mounted above each of the locking shoulders 23a, and secured by a bracket 76 to the flange 54 is a normally open switch 75. Depression of the answer selecting tab 23 causes the locking shoulder 23a to engage the roller of a flexible arm 77 which, in turn, depresses the contact element 78 to close the switch 75.

A switch 85 (see FIGURE 8), similar to each of the switches 75, is mounted by an appropriate bracket 89 upon the side wall 14. The switch 85 embodies a flexible arm and roller 87 which abuts one face 90 of the film sprocket 29. This surface 90 is provided with a plurality of protuberances or bosses 86 which engage the flexible arm 87 of the switch 85 as the sprocket 29 is rotated by advance of the film 27. Hence, rotation of the sprocket 29, a distance governed by the spacing between adjacent bosses 86, will cause at least one of the bosses to engage the flexible arm 87 and depress the contact element 88 to close the switch 85.

Referring now to the circuit diagram of FIGURE 7, the energizing coil of the solenoid 68 is shown in series with a D.-C. power source 91. Also in series with the solenoid 68 and source 91 is the switch 85 and a parallel bank of the switches 75. Hence, in order to energize the solenoid 68 by the source 91, both the switch 85 and any one of the switches 75 must be closed to complete the energizing circuit between the power source and the solenoid. It will be apparent that these conditions can be satisfied by the mechanical arrangements of FIGURES 6, 9 and 10 only when both of two prescribed operations are performed by the student in using the teaching machine 11 of the present invention. These operations involve:

(1) Selection of a single answer 19 by depressing an answer selecting tab 23 to close one of the switches 75; and (2) Rotation of the hand crank 24, in accordance with the directions 20 received by the student, to actuate the switch 85.

When the latter operational sequence is performed by the student, during the learning process, the circuit of FIGURE 7 is completed and the answering system is unlocked and ready to use in connection with a subsequent film frame.

Referring now particularly to FIGURES 1, 4 and 8, the drive system shown for the film 27 will now be explained. The hand crank 24 carries a shaft 104 which is keyed at 106 to an internal sleeve 108 of a pulley wheel 101, the pulley wheel being secured to the reel 25 so that the pulley wheel and reel rotate together. Similarly, the reel 26 and internal sleeve 109 of a pulley wheel 102 are keyed at 107 for rotation with a shaft 105 which is, in turn, journaled for rotation within a collar 100 secured to the side wall 14 in the machine housing. Sleeve members 108, 109 of pulley wheels 101, 102, respectively, are rotatable with respect to the outer rims of their respective pulley wheels. In this regard, each of the sleeves 108, 109 is provided with angled recesses or pockets 110, 111, respectively, each recess carrying a bearing element, shown as balls 112.

The pulley wheels 101, 102 are joined by a suitable belt 103 so that both pulley wheels are always rotated in the same direction. However, for a given direction of rotation of the crank 24, one pulley wheel becomes a driving wheel whereas the other pulley wheel becomes a driven wheel. For example, for the direction of rotation of the hand crank 24 shown in FIGURE 8, the pulley wheel 102 is the driving wheel, since rotation of the sleeve 109 in the counterclockwise direction causes the balls 112 in each of the recesses 110 to wedge and eliminate slippage between the sleeve and the outer rim of the pulley wheel. On the other hand, counterclockwise rotation of the sleeve 108 of the pulley wheel 101 causes the balls 112 to seat within the pockets 111 in a manner which allows slippage of the sleeve 108 with respect to the outer rim of the pulley wheel.

When the crank 24 is rotated in the opposite direction (clockwise), the conditions are reversed, and the pulley wheel 101 becomes the driving wheel with the pulley wheel 102 behaving passively as a driven wheel. Hence, a simple mechanical arrangement is afforded for driving the film 27 in either direction from a single manually operated hand crank 24.

Referring now particularly to FIGURE 10, the film sprocket 29 is shown to embody a structural arrangement for improving the registration of film frame images upon the display screen 15 when the crank 24 is operated by the student. The sprocket 29 carries a plurality of recesses 116 located in the surface 90 of the sprocket. The angular spacing between adjacent recesses 116 is equal to the number of degrees of sprocket rotation between adjacent frames of the film 27. In this regard, the shaft 115, upon which the sprocket 29 rotates, is journaled within a fixed boss 117 having a depending leg and ball detent mechanism 118 which engages each of the recesses 116 as the sprocket 29 rotates past the boss. In this manner, each film frame is locked into registration upon the display screen 15 as the sprocket wheel 29 is rotated by the advancing film 27 in moving from one film frame to another.

The self-tutoring machine of the present invention satisfies a long existing need in the educational field for a simple and economical device which closely approximates the very desirable teacher-individual student learning situation. Moreover, the teaching machine of the present invention not only tailors the course of study to meet the needs and demonstrated capabilities of the individual student, but also provides the student with immediate knowledge of the results of his studies in a mechanism which is less amenable to cheating upon the part of the student.

It will be apparent from the foregoing that, while a particular form of my invention has been illustrated and described, various modifications can be made without departing from the spirit and scope of my invention. Accordingly, I do not intend that my invention be limited, except as by the appended claims.

I claim:
1. A self-tutoring device comprising:
a plurality of information items to be selectively viewed, each item including a question and a plurality of answers based upon said information item;
means responsive to the selection of a single one of said answers to provide an immediate indication of the correctness or incorrectness of the selected answer and directions to the location of the next item of information to be viewed in logical sequence in accordance with the selected answer;
locking means to prevent the selection of more than one answer; and
disabling means for releasing said locking means, said disabling means being operable only upon proceeding to follow the directions presented for the selected answer.

2. The self-tutoring device of claim 1 wherein said plurality of information items are consecutively numbered, but the logical sequence of information items is not in consecutive order.

3. In a teaching machine, the combination comprising:
a plurality of information items arranged to be selectively viewed one at a time, each information item including a question and a plurality of answers for assessing the assimilation of the information presented, each answer having associated therewith an advice line providing the viewer with immediate knowledge of the correctness or incorrectness of the answer and directions to the next information item to be viewed;
masking means for each advice line to shield each advice line from view;
means associated with each answer for removing the masking means shielding the corresponding advice line and for simultaneously restraining the masking means for every other advice line against removal;
and resetting means for resetting the masking means removed and releasing the restraint upon other said masking means, said resetting means being operable only in changing from one item of information to another item of information.

4. A tutoring device comprising:
a record strip bearing a plurality of items of information;
each item of information including at least a question, a plurality of answers and a plurality of advice lines, one for each answer, each advice line bearing indicia of the correctness or incorrectness of the corresponding answer and directions as to the location of the next item to be viewed based upon the degree of correctness or incorrectness of the answer;
display means for presenting said items of information for visual consideration one at a time;
manually actuated drive means for selectively positioning said record strip such that selected individual items of information may be viewed;
removable masking means having portions shielding from view each of the advice lines of each information item displayed;
manually operated means for selectively removing only the portion of said masking means corresponding to a selected answer and simultaneously locking remaining portions of said masking means against removal;
and means cooperating with said drive means to reset the removed portion of said masking means and unlock the remaining portions of said masking means when said record strip has been moved by said drive means a prescribed distance.

5. A tutoring device as set forth in claim 4 wherein each of said items of information upon said record strip are numbered consecutively but the positions of said items upon said record strip are scrambled such that the information upon successive items along said record strip is not in logical sequence.

6. A teaching machine adapted for self-tutoring comprising:
a film strip having a plurality of items of information as individual frames thereof;
each frame including text material, a question, a plurality of answers to said question, and indicia for each answer advising as to the correctness or incorrectness of the answer and the location on said film strip of the next frame to be viewed in a logical sequence determined by said answer, all of said frames being consecutively numbered but the logical sequence of text materials being in non-consecutive order;

a manually operated reeling mechanism for advancing said film strip to different positions;

an optical system for projecting images of said film frames upon a viewing screen;

shielding means concealing the indicia for each answer from view;

selection means coupled to said shielding means to reveal the indicia for a single answer;

locking means actuated by said selection means and coupled to said shielding means for restraining said shielding means against removal once the indicia for any one answer has been revealed;

and releasing means actuated by said reeling mechanism for disabling said locking means when said reeling mechanism advances said film strip a prescribed distance.

7. The teaching machine of claim 6 including means coupled to said reeling mechanism to enhance the registration of images upon said viewing screen.

8. A teaching machine as set forth in claim 6 including electrical circuit means connecting a source of electrical power to said releasing means, said electrical circuit means being operable only upon actuation of both said selection means and said reeling mechanism.

9. An instructional aid adapted for self-tutoring, comprising in combination:

a film strip having a plurality of items of information arranged as individual film frames thereof;

each frame including text material, a question, a plurality of answers to said question, and indicia positioned upon said frame beside each answer advising as to the correctness or incorrectness of the answer and the physical location on said film strip of the next frame to be viewed in a specific logical sequence determined by the degree of correctness of incorrectness of said answer, all of said film frames being consecutively numbered along said film strip but the logical sequence of text materials being in non-consecutive order;

an optical system for projecting images of said film frames;

a screen upon which said images of said film frames are projected for consideration one at a time;

a plurality of retractable answer bars, one for each answer, overlaying a portion of said screen and shielding the indicia for each answer from view;

selection means for retracting said answer bars one at a time;

locking means actuated by said selection means upon retraction of one of said answer bars to restrain each of the remaining answer bars against retraction;

manually operated film advancing means for selecting individual film frames to be viewed;

and resetting means conditioned by said selection means and actuated by said film advancing means to restore a retracted answer bar and to disengage said locking means from said remaining answer bars.

10. An instructional aid as set forth in claim 9 wherein said optical system includes a lens and a plurality of mirrors interposed in the projection path between said lens and said screen, whereby a long projection path between said lens and said screen may be obtained within limited confines.

11. The instructional aid of claim 9 wherein said resetting means is electrically operated.

12. A visual aid comprising:

a film strip having items of information on respective frames thereof;

a screen upon which to project images of said frames one at a time;

means masking a portion of said screen, at least two portions of each image being projected onto the portion of said screen that is masked;

respective means to selectively remove a portion of said masking means to permit visual inspection of one of said masked portions of the image projected upon said screen;

and means interlocking the removing means to prevent all other removing means from unmasking when one removing means is operated to unmask.

13. A tutoring device comprising:

a record strip bearing a plurality of items of information;

display means for presenting said items of information for visual consideration one at a time;

manually actuated drive means for selectively positioning said record strip such that selected individual items of information may be viewed;

a plurality of removable masking means shielding from view portions of each information item displayed;

manually operated means for selectively removing only one of said masking means corresponding to one portion of an information item being displayed and simultaneously locking all remaining masking means against removal;

and means cooperating with said drive means to reset the removed one of said masking means and unlock the remaining of said masking means when said record strip has been moved by said drive means a prescribed distance.

14. An instructional aid adapted for self-tutoring, comprising in combination:

a film strip having items of information on respective film frames thereof;

an optical system for projecting images of said film frames;

a screen upon which said images of said film frames are projected for consideration one at a time;

a plurality of retractable masking bars overlaying and shielding from view portions of each film frame projected upon said screen;

selection means for retracting said masking bars one at a time;

locking means actuated by said selection means upon retraction of one of said masking bars to restrain each of the remaining masking bars against retraction;

manually operated film advancing means for selecting individual film frames to be viewed;

and resetting means conditioned by said selection means and actuated by said film advancing means to restore a retracted masking bar and to disengage said locking means from said remaining masking bars.

15. An instructional aid adapted for self-tutoring, comprising in combination:

a housing;

a film strip in said housing, said film strip having a plurality of items of information arranged as individual film frames thereof;

each frame including text material, a question, a plurality of answers to said question, and indicia positioned upon said frame beside each answer advising as to the correctness or incorrectness of the answer and the physical location on said film strip of the next frame to be viewed in a specific logical sequence determined by the degree of correctness or incorrectness of said answer, all of said film frames being consecutively numbered along said film strip but the logical sequence of text materials being in non-consecutive order;

an optical system within said housing for projecting images of said film frames;

a front panel in said housing, portions of said panel being cut away to provide a larger aperture and a plurality of lesser apertures;

a screen upon which said images of said film frames are projected for consideration one at a time, said screen being mounted within the larger aperture on said front panel and overlaying said lesser apertures;

a plurality of retractable answer bars, one for each answer, overlaying the portions of said screen in alignment with said lesser apertures and shielding the indicia for each answer from view;

selection means for retracting said answer bars one at a time;

locking means actuated by said selection means upon retraction of one of said answer bars to restrain each of the remaining answer bars against retraction;

manually operated film advancing means for selecting individual film frames to be viewed;

and resetting means conditioned by said selection means and actuated by said film advancing means to restore a retracted answer bar and to disengage said locking means from said remaining answer bars.

References Cited in the file of this patent

UNITED STATES PATENTS

| | | |
|---|---|---|
| 2,401,434 | Mills | June 4, 1946 |
| 2,564,089 | Williams et al. | Aug. 14, 1951 |
| 3,056,215 | Skinner | Oct. 2, 1962 |
| 3,095,654 | Cummings | July 2, 1963 |

OTHER REFERENCES

Electronic Teaching Machines, November 1960.